United States Patent [19]
Aibe et al.

[11] 3,926,590
[45] Dec. 16, 1975

[54] PROCESS FOR TREATMENT OF WASTE GASES

[75] Inventors: Toshio Aibe; Seiji Mochida, both of Osaka; Kiyoshi Itoga, Hyogo, all of Japan

[73] Assignee: Takeda Chemical Industries, Ltd., Japan

[22] Filed: Oct. 17, 1973

[21] Appl. No.: 407,287

[30] Foreign Application Priority Data
Oct. 24, 1972  Japan............................... 47-106473

[52] U.S. Cl. ........................... 55/68; 55/73; 423/244
[51] Int. Cl.² .......................................... B01D 53/04
[58] Field of Search ..................... 55/68, 73, 74, 75; 252/438; 423/244

[56] References Cited
UNITED STATES PATENTS

| | | | |
|---|---|---|---|
| 3,508,382 | 4/1970 | Schoofs et al. | 55/73 |
| 3,578,390 | 5/1971 | Kruel et al. | 55/73 |
| 3,630,890 | 12/1971 | Carr et al. | 55/73 |

*Primary Examiner*—Charles N. Hart
*Attorney, Agent, or Firm*—Wenderoth, Lind & Ponack

[57] ABSTRACT

Waste gas containing sulfur oxide and/or nitrogen oxide is allowed to contact with activated carbon which is previously treated with ammonia at an elevated temperature, whereby sulfur oxide and/or nitrogen oxide is removed from the gas.

7 Claims, No Drawings

PROCESS FOR TREATMENT OF WASTE GASES

This invention relates to a method of treating waste gases containing sulfur oxide and/or nitrogen oxide.

In recent years, waste gases from such installations as steam-power plants, chemical plants, metal refineries and metal washing plants have been causes for public complaints and there is a pressing need for the establishment of an efficient method for eliminating from waste gases sulfur oxide and nitrogen oxide, both of which are major sources of atmospheric pollutions.

As a method of removing sulfur oxide and nitrogen oxide from waste gases, attention has recently been focussed on the so-called activated carbon process which involves contacting waste gases with activated carbon and much study has been undertaken on the industrial application of the process.

The activated carbon process takes advantage of the catalytic activity of activated carbon which helps oxidize the sulfur oxide and nitrogen oxide contained in the waste gas, but, so far, the activated carbons prepared by conventional methods have proved unsatisfactory, for they are not only inadequate in catalytic activity but also suffer considerable decrease in its activity on prolonged service.

Under the circumstances we conducted extensive studies and ultimately succeeded in overcoming the disadvantages by employing a modified activated carbon. This invention is the culmination of the above research.

This invention is thus directed to a method of treating an waste gas characterized in that a modified activated carbon which is obtainable by contacting activated carbon with gaseous ammonia at 200° to 1,300°C is contacted with a waste gas containing sulfur oxide and/or nitrogen oxide, whereby said sulfur oxide and/or nitrogen oxide is eliminated from said waste gas.

The sulfur oxide mentioned above is for the most part $SO_2$ and said nitrogen oxide is usually a mixture of $NO$ and $NO_2$.

The waste gas in the present invention includes, for example, gases by-produced when sulfur- and/or nitrogen-containing compounds, materials or substances (e.g. cokes, coals, petroleums, gasolines, mineral oils, iron ores, copper ores or other ores, sulfur trioxide, etc.) are subjected to thermal treatment, burned, calcinated, or subjected to some chemical treatment. Typical sources of the waste gas are steam power plants, boilers, metal refineries, metal washing plants, plant of manufacturing nitric acid, plant of manufacturing sulfuric acid, etc.

The waste gas to be treated in the present invention contains, usually, other than sulfur oxide and/or nitrogen oxide, various gas such as water vapor, oxygen, carbon dioxide, nitrogen, etc.

The activated carbon to be employed in the method of this invention can be prepared by contacting activated carbon with gaseous ammonia under heating. The material carbon may be any of the activated carbons which are based on such known materials as charcoal, coke, coconut shell, etc. and have been activated by conventional activation procedures and which have surface areas within the range of about 200 to about 2,000 $m^2/g$. It should be understood that the carbon which has been deactivated to a certain extent by its service in waste gas treatment may also be employed in the present method. The lower limit of the heating temperature is not lower than about 200°C, preferably, not lower than about 300°C, most preferably, not lower than about 500°C, and the upper limit thereof is not higher than about 1,300°C, preferably, not higher than about 950°C. The proportion of ammonia to be contacted with each gram of activated carbon is desirably not less than 1 millimole and, for better results, not less than 10 millimoles. The linear velocity of gaseous ammonia relative to activated carbon is in the range of 0.01 – 100cm/sec. and space velocity of gaseous ammonia (volume of gaseous ammonia per volume of activated carbon per hour) is in the range of 10 – 10,000 $hr^{-1}$. The contacting time may be as short as 10 minutes. In this connection, it is advisable to employ ammonia in admixture with an inert gas carrier such as, for example, nitrogen gas or a flue gas. The proportion of said inert gas is within the range of 0 to about 90 percent by volume relative to the gaseous ammonia. Further, if, before the activated carbon is contacted with ammonia, a small amount of sulfuric acid, nitric acid, ammonium sulfate or/and ammonium nitrate is previously added to the activated carbon by adsorption or immersion, there is obtained the activated carbon whose catalytic activity has been further improved. Usually, the proportion of these addenda is preferably about 1 millimole per gram of activated carbon.

Contact of the activated carbon with gaseous ammonia is conducted in a conventional manner, for example, by fluidizing an activated carbon in a vertical type column by introducing gaseous ammonia from the bottom of the column; by passing gaseous ammonia through the activated carbon packed in a horizontal type column; by passing gaseous ammonia through an activated carbon moving in a vertical type column; and the like.

The method of this invention is carried into practice by contacting the above treated activated carbon with a sulfur oxide and/or nitrogen oxide-containing waste gas. The contacting temperature may range from room temperature to about 200°C and, preferably, from about 40° to about 150°C.

Contact of the waste gas with the above-treated activated carbon is conducted in a conventional manner; for example, the above-treated activated carbon is packed in a column or tower and the waste gas is introduced into the column or tower. For this purpose, any system of fixed bed, moving bed, fluidized bed, spouting bed, etc. may be employed. In case of moving bed system, waste gas may flow in a counter current, a parallel current or a cross current relative to the activated carbon, and in case of fixed bed system, a swing reactor system may be employed.

An amount of the above-treated activated carbon to be used is such that a space velocity of the gas (volume of treated waste gas per volume of the activated carbon per hour) is not higher than about 30,000 $hr^{-1}$, more preferably not higher than about 6,000 $hr^{-1}$ and that liner velocity of the gas is from 1 to 200 cm/sec., more preferably from 5 to 100 cm/sec.

By the above treatment of the waste gas with the activated carbon, sulfur oxide and/or nitrogen oxide contained in the gas are adsorbed on the activated carbon. When the waste gas contains oxygen and water vapor, sulfur oxide is adsorbed in a form of sulfuric acid and nitrogen oxide is adsorbed in a form of nitric acid.

Thus, after the above treatment, the waste gas becomes almost free from sulfur oxide and nitrogen oxide.

This treatment may be continued until the activated carbon has adsorbed a saturated amount of sulfuric acid and/or nitric acid with the result that its sulfur oxide- and/or nitrogen oxide-adsorbing activity has dropped. Practically, it is advantageous from the viewpoint of preventing the air-pollution to stop the treatment when an amount of sulfur oxide and/or nitrogen oxide to be removed by this treatment is reduced to about 90 percent relative to the total amount of the same contained in the original waste gas. Though such a time varies with such factors as the kinds of waste gases, the temperature, the space velocity and the like, it generally occurs between about 10 hours and about 50 hours from the start of the treatment. The carbon saturated with sulfur oxide and/or nitrogen oxide can easily be regenerated by subjecting the same to a conventional desorption process. As the desorption process there may be counted, among others, heating of the saturated carbon in an inert gas such as nitrogen or treating of the saturated carbon with water, preferably at a high temperature.

Further, though the activated carbon is degraded also by many repetitions of adsorption-desorption cycle, the carbon so degraded can be regenerated by subjecting the carbon to the $NH_3$-treatment mentioned above. The activity of the carbon regenerated by the $NH_3$-treatment is rather higher than that of the activated carbon firstly subjected to the $NH_3$-treatment.

Throughout the present specification as well as claims the abbreviations "mg.", "g.", "ml.", "cm.", "m.", "m².", "°C", "sec.", "min.", "hr.", "wt." and "vol." respectively refer to "milligram(s)", "gram(s)", "milliliter(s)", "centimeter(s)", "meter(s)", "square meter(s)", "degree(s) centigrade", "second(s)", "minute(s)", "hour(s)", "weight(s)" and "volume(s)", "surface area" is that measured by Brunauer, Emett & Teller (B.E.T.) method described in, e.g., "Journal of the American Chemical Society", 60, 309(1938).

The following examples are further illustrative of this invention.

EXAMPLE 1

Quartz-glass columns, 3.5 cm in diameter, were each filled with 10 g. of granular activated carbon, 635 m²/g. in B.E.T. surface area, and $N_2$ gas containing 20 volume percent of $NH_3$ was passed at 400 ml./min. at the varying temperatures of 200°C, 300°C, 500°C, 700°C, 950°C and 1150°C for 30 minutes. Then, $N_2$ gas was further introduced at the same temperatures for 30 minutes and the columns were allowed to cool to room temperature in $N_2$ gas streams to obtain modified activated carbons (1) through (6). The $N_2$ gas containing 20 vol. percent of $NH_3$ in the above procedure was replaced with $N_2$ gas to prepare control samples (1') through (6'). Two grams each of thus treated activated carbons (1)–(6) and (1')–(6') were respectively packed into glass columns, 1 cm in diameter, and subjected to an $SO_2$-absorption test. The test gas used was a mixture of 0.1 vol. percent of $SO_2$, 6.5 vol. percent of $O_2$, 10.0 vol. percent of $H_2O$ and 83.4 vol. percent of $N_2$ and the linear velocity of the gas was 30 cm/sec. The adsorption temperature was 130°C and the adsorption time was 8 hours.

After the adsorption, each activated carbon was regenerated by heating to 300°C in a current of $N_2$ at a linear gas velocity of 0.3 cm/sec. for 1 hour and the amount of $SO_2$ adsorbed was determined. After this regeneration treatment, the carbon sample was subjected to the adsorption procedure a second time. This adsorption-thermal desorption cycle was repeated. The relation of the number of adsorption-desorption cycles and the amount of $SO_2$ adsorbed is shown in Table 1.

Table 1

The amount of $SO_2$ adsorbed ($SO_2$ mg/g. activated carbon)

| Activated carbon. No. | Gas treated | Treating temperature (°C) | Number of adsorption-desorption cycles (times) | | | | |
|---|---|---|---|---|---|---|---|
| | | | 1 | 2 | 5 | 10 | 20 |
| (1) | $NH_3$ | 200 | 96 | 90 | 63 | 47 | 38 |
| (2) | | 300 | 108 | 102 | 86 | 70 | 48 |
| (3) | | 500 | 121 | 114 | 85 | 75 | 59 |
| (4) | | 700 | 129 | 130 | 99 | 81 | 65 |
| (5) | | 950 | 135 | 131 | 109 | 82 | 68 |
| (6) | | 1150 | 120 | 119 | 95 | 88 | 67 |
| (1') | $N_2$ | 200 | 95 | 91 | 60 | 42 | 29 |
| (2') | | 300 | 95 | 88 | 55 | 40 | 30 |
| (3') | | 500 | 95 | 89 | 52 | 40 | 28 |
| (4') | | 700 | 97 | 90 | 50 | 39 | 30 |
| (5') | | 950 | 100 | 90 | 55 | 40 | 28 |
| (6') | | 1150 | 80 | 72 | 59 | 39 | 31 |

EXAMPLE 2

$NH_3$-treated activated carbons (1) to (5) and $N_2$-treated carbons (1') to (5'), all being similar to the corresponding samples described in Example 1, were caused to adsorb $SO_2$ under conditions similar to those set forth in Example 1. After $SO_2$-adsorption, water at 60°C was poured down over each carbon sample at the rate of 200 cc./hr. for 4 hours to wash and regenerate the carbon. This adsorption-water desorption cycle was repeated. The relation of the number of adsorption-regeneration cycles and the amount of $SO_2$ adsorbed is shown in Table 2.

Table 2

The amount of $SO_2$ adsorbed ($SO_2$ mg./g. activated carbon)

| Activated carbon. No. | Gas treated | Treating temperature (°C) | Number of adsorption-desorption cycles (times) | | | | |
|---|---|---|---|---|---|---|---|
| | | | 1 | 2 | 5 | 10 | 20 |
| (1) | $NH_3$ | 200 | 101 | 98 | 88 | 75 | 60 |
| (2) | | 300 | 105 | 104 | 90 | 79 | 68 |
| (3) | | 500 | 125 | 120 | 111 | 102 | 91 |
| (4) | | 700 | 143 | 142 | 138 | 120 | 108 |
| (5) | | 950 | 145 | 145 | 138 | 121 | 108 |
| (1') | $N_2$ | 200 | 99 | 97 | 84 | 70 | 56 |
| (2') | | 300 | 100 | 97 | 85 | 69 | 55 |
| (3') | | 500 | 95 | 90 | 75 | 70 | 50 |
| (4') | | 700 | 98 | 91 | 81 | 70 | 51 |
| (5') | | 950 | 98 | 88 | 76 | 65 | 53 |

EXAMPLE 3

Two grams of granular activated carbon, 780 m²/g. in B.E.T. surface area, were directly subjected to $SO_2$ adsorption/thermal desorption cycles in the same manner as Example 1, without being previously treated with ammonia. The relation of the number of adsorption-desorption cycles and the $SO_2$-adsorptive capacity of the carbon is shown in Table 3.

Table 3

| Number of adsorption-thermal desorption cycles (times) | $SO_2$ adsorbed (mg./g. activated carbon) |
|---|---|
| 1 | 130 |

Table 3-continued

| Number of adsorption-thermal desorption cycles (times) | SO$_2$ adsorbed (mg./g. activated carbon) |
| --- | --- |
| 4 | 102 |
| 9 | 76 |
| 12 | 65 |

The used carbon was further treated with NH$_3$ at 500°C in the same manner as Example 1 and subjected to SO$_2$-adsorption-thermal desorption cycles under conditions similar to those described in Example 1. The result is set forth below.

Table 4

| Number of adsorption-thermal desorption cycles (times) | SO$_2$ adsorbed (mg./g. activated carbon) |
| --- | --- |
| 1 | 169 |
| 4 | 135 |
| 9 | 109 |
| 12 | 88 |

EXAMPLE 4

Two grams of granular activated carbon, 740 m$^2$/g. in B.E.T. surface area, were subjected to adsorption-water desorption cycles under the same conditions as Example 2, without being previously treated with ammonia. It was found that by the end of the 50th cycle, the SO$_2$-adsorptive capacity of the carbon had decreased in a considerable measure. The data are given in Table 5.

Table 5

| Number of adsorption-water desorption cycles (times) | SO$_2$ adsorbed (mg./g. activated carbon) |
| --- | --- |
| 1 | 131 |
| 10 | 112 |
| 30 | 76 |
| 50 | 57 |

The used carbon was treated with NH$_3$ at 700°C in the same manner as Example 1 and, then, subjected to SO$_2$ adsorption-water desorption cycles under conditions similar to those described in Example 2. The result is set forth in Table 6.

Table 6

| Number of adsorption-water desorption cycles (times) | SO$_2$ adsorbed (mg./g. activated carbon) |
| --- | --- |
| 1 | 154 |
| 10 | 135 |
| 30 | 100 |

EXAMPLE 5

Crushed activated carbon (6–10 mesh), 1205 m$^2$/g. in B.E.T. surface area, was treated with NH$_3$ at 950°C in the same manner as Example 1 and 130 g. of the thus-treated carbon was packed into a glass column, 5 cm in diameter, to a height of 15 cm. While the column was maintained at a constant temperature of 60°C, the carbon was sufficiently wetted with warm water at 60°C. Then, warm water at 60°C was passed down the column at a flow rate of 1.5 g./min. and, simultaneously, a mixed gas of 0.1 vol. percent of SO$_2$, 6.5 vol. percent of O$_2$, 10.0 vol. percent of H$_2$O and 83.4 vol. percent of N$_2$, the temperature of which was maintained at 128°C, was introduced from the column top at a linear velocity of 10 cm/sec. After 2 hours, the rate of desulfurization and the concentration of reclaimed sulfuric acid were constant at 80 percent and 6.4 weight percent, respectively.

The activated carbon treated in the same manner as above except that N$_2$ was used instead of NH$_3$ at 950°C was subjected to the wet desulfurization test under the conditions set forth above.

After 2 hours, the percent of desulfurization and the concentration of reclaimed sulfuric acid were constant at 52 percent and 4.2 Wt. percent, respectively.

EXAMPLE 6

Ten grams of granular activated carbon, 670 m$^2$/g. in B.E.T. surface area, were NH$_3$-treated at 700°C in the same manner as Example 1. Two grams of the thus-treated carbon were packed into a glass column 1 cm in diameter, and a mixed gas of 0.06 vol. percent of nitrogen oxide (70 percent NO and 30 percent NO$_2$), 3.0 vol. percent of H$_2$O and 96.94 vol. percent of air was introduced into the column at a linear velocity of 10 cm/sec. at 60°C for 5 hours to let the nitrogen oxide adsorbed.

A similar test was performed on a similar activated carbon sample treated with N$_2$ instead of NH$_3$. The carbon which had thus adsorbed nitrogen oxide was then regenerated by heating it to 150°C in a current of N$_2$ at a linear velocity of 0.3 cm/sec. for 1 hour and the amount of nitrogen oxide adsorbed was determined as NO$_2$. After regeneration, the adsorption of nitrogen oxide was carried out for a second time.

This cycle of adsorption-thermal desorption was repeated. The relation of the number of such adsorption-thermal desorption cycles and the amount of nitrogen oxide adsorbed is shown in Table 7.

Table 7

| | | | The amount of nitrogen oxide (Nitrogen oxide mg./g. activated carbon) | | |
| --- | --- | --- | --- | --- | --- |
| Gas treated | Treating temperature (°C) | Method for adsorption-desorption | Numer of adsorption-desorption cycles (times) | | |
| | | | 1 | 5 | 10 |
| NH$_3$ | 700 | Nitrogen oxide adsorption and thermal desorption | 73 | 60 | 51 |
| N$_2$ | 700 | Nitrogen oxide adsorption and thermal desorption | 55 | 38 | 26 |

EXAMPLE 7

The activated carbon treated with NH$_3$ at 700°C in the same manner as Example 6 was caused to adsorb nitrogen oxide under conditions similar to those described in Example 6.

After the adsorption of nitrogen oxide, water at 50°C was run over the carbon at the rate of 200 ml./hr. for 4 hours, whereby the carbon was regenerated.

The activated carbon sample treated with N$_2$ instead of NH$_3$ was also subjected to the same adsorption-desorption treatment. This adsorption-desorption cycle was repeated. The relation of the number of such cycles and the amount of nitrogen oxide adsorbed by the activated carbon is as shown in Table 8.

Table 8

| Gas treated | Treating temperature (°C) | Method for adsorption-desorption | Number of adsorption-desorption cycles (times) | | |
|---|---|---|---|---|---|
| | | | 1 | 5 | 10 |
| The amount of nitrogen oxide (Nitrogen oxide mg./g. activated carbon) | | | | | |
| $NH_3$ | 700 | Nitrogen oxide adsorption-water desorption | 78 | 66 | 59 |
| $N_2$ | 700 | Nitrogen oxide adsorption-water desorption | 53 | 40 | 32 |

What is claimed is:

1. A process of treating waste gas which comprises contacting a modified activated carbon which is prepared by contacting activated carbon with gaseous ammonia at 300° to 1,300°C, with a waste gas containing sulfur oxide and/or nitrogen oxide at room temperature to 200°C to remove the sulfur oxide and/or nitrogen oxide from the said waste gas.

2. A process as claimed in claim 1, wherein the modified activated carbon is contacted with waste gas at 40°–150°C.

3. A process as claimed in claim 1, wherein the modified activated carbon is contacted with waste gas at a linear gas velocity in the range of 1 to 200 cm/sec.

4. A process as claimed in claim 1, wherein the waste gas is one containing sulfur oxide.

5. A process as claimed in claim 1, wherein the waste gas is one containing nitrogen oxide.

6. A process as claimed in claim 1, wherein the modified activated carbon is one prepared by contacting activated carbon with gaseous ammonia at 300° to 950°C.

7. A process as claimed in claim 1, wherein the modified activated carbon is one prepared by contacting activated carbon with ammonia at 500° to 950°C.

* * * * *